United States Patent
Chen et al.

(10) Patent No.: US 10,891,142 B2
(45) Date of Patent: Jan. 12, 2021

(54) METHOD AND DEVICE FOR PRELOADING APPLICATION, STORAGE MEDIUM, AND TERMINAL DEVICE

(71) Applicant: Guangdong Oppo Mobile Telecommunications Corp., Ltd., Guangdong (CN)

(72) Inventors: Yan Chen, Guangdong (CN); Yaoyong Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 116 days.

(21) Appl. No.: 16/188,929

(22) Filed: Nov. 13, 2018

(65) Prior Publication Data

US 2019/0196849 A1    Jun. 27, 2019

(30) Foreign Application Priority Data

Dec. 21, 2017    (CN) .......................... 2017 1 1396149

(51) Int. Cl.
*G06F 9/445* (2018.01)
*G06F 9/48* (2006.01)
(Continued)

(52) U.S. Cl.
CPC .......... *G06F 9/44578* (2013.01); *G06F 9/445* (2013.01); *G06F 9/4491* (2018.02); *G06F 9/485* (2013.01); *H04L 29/08* (2013.01)

(58) Field of Classification Search
CPC ...... G06F 9/445; G06F 9/5016; G06F 9/5027; G06F 17/30595; G06N 20/20; G06N 5/003; G06K 9/6282; H04L 67/10
See application file for complete search history.

(56) References Cited

U.S. PATENT DOCUMENTS

| 8,161,548 B1* | 4/2012 | Wan ..................... G06K 9/6228 726/22 |
| 8,245,295 B2* | 8/2012 | Park ..................... G06F 21/552 726/22 |

(Continued)

FOREIGN PATENT DOCUMENTS

| CN | 105955765 A | 9/2016 |
| CN | 106843961 A | 6/2017 |

(Continued)

OTHER PUBLICATIONS

Kaohsi, Web Usage Mining Based on Clustering of Browsing Features, IEEE, Date of Conference: Nov. 26-28, 2008.*

(Continued)

*Primary Examiner* — Aurel Prifti

(57) ABSTRACT

A method for preloading an application, a storage medium, and a terminal device are provided. The method includes the following. In response to a target application being detected to be closed, current state feature information of a terminal device is acquired. The current state feature information is compared with historical state feature information of the terminal device when the target application was closed. Target historical state feature information closest to the current state feature information is determined from within the historical state feature information according to a comparison result. The target application is preloaded, in response to determining that the target application is about to be launched again according to a historical usage regularity corresponding to the target historical state feature information.

14 Claims, 5 Drawing Sheets

(51) Int. Cl.
*G06F 9/448* (2018.01)
*H04L 29/08* (2006.01)

(56) References Cited

U.S. PATENT DOCUMENTS

| | | | | |
|---|---|---|---|---|
| 9,911,290 | B1* | 3/2018 | Zalewski | G06Q 30/0633 |
| 2006/0085854 | A1* | 4/2006 | Agrawal | G06F 21/55 |
| | | | | 726/23 |
| 2007/0136455 | A1* | 6/2007 | Lee | G06F 21/564 |
| | | | | 709/223 |
| 2009/0199296 | A1* | 8/2009 | Xie | G06F 21/316 |
| | | | | 726/23 |
| 2010/0192201 | A1* | 7/2010 | Shimoni | H04L 63/1458 |
| | | | | 726/3 |
| 2012/0321175 | A1* | 12/2012 | Hedau | G06K 9/6231 |
| | | | | 382/159 |
| 2012/0324481 | A1* | 12/2012 | Xia | G06F 9/485 |
| | | | | 719/320 |
| 2014/0032358 | A1* | 1/2014 | Perkowitz | G06N 20/00 |
| | | | | 705/26.7 |
| 2014/0237595 | A1* | 8/2014 | Sridhara | G06F 21/55 |
| | | | | 726/23 |
| 2014/0365808 | A1* | 12/2014 | Deshmukh | G06F 1/12 |
| | | | | 713/375 |
| 2014/0372356 | A1* | 12/2014 | Bilal | G06F 9/44578 |
| | | | | 706/46 |
| 2014/0380326 | A1* | 12/2014 | Kurihara | G06F 9/50 |
| | | | | 718/102 |
| 2015/0006559 | A1* | 1/2015 | Meierhoefer | G06F 16/00 |
| | | | | 707/758 |
| 2015/0293701 | A1* | 10/2015 | Kim | G06F 3/0671 |
| | | | | 710/5 |
| 2016/0350198 | A1* | 12/2016 | Neuvirth-Telem | G06N 20/00 |
| 2017/0026949 | A1* | 1/2017 | Ouyang | H04L 67/22 |
| 2017/0031690 | A1* | 2/2017 | Ren | G06F 9/445 |
| 2017/0185250 | A1* | 6/2017 | Cho | G06F 3/0482 |
| 2018/0293087 | A1* | 10/2018 | Lee | G06F 9/44578 |
| 2018/0365037 | A1* | 12/2018 | Zeng | G06F 9/445 |
| 2019/0188000 | A1* | 6/2019 | Chen | G06F 9/5016 |
| 2019/0188595 | A1* | 6/2019 | Chen | G06F 9/445 |
| 2019/0370021 | A1* | 12/2019 | Chen | G06F 9/4875 |
| 2019/0370095 | A1* | 12/2019 | Chen | G06F 9/44505 |
| 2019/0370657 | A1* | 12/2019 | Chen | G06N 3/082 |
| 2019/0380603 | A1* | 12/2019 | Schouenborg | A61B 5/42 |

FOREIGN PATENT DOCUMENTS

| | | |
|---|---|---|
| CN | 107295044 A | 10/2017 |
| CN | 108228270 A | 6/2018 |
| CN | 108363593 A | 8/2018 |
| CN | 108595227 A | 9/2018 |
| CN | 108595230 A | 9/2018 |

OTHER PUBLICATIONS

Performance prediction based on inherent program similarity, Feb. 9, 2017.*
Zamfiroiu Alin, A model for users' profile recognition based on their behavior in online applications, Jan. 201.*
International search report issued in corresponding international application No. PCT/CN2018/113994 dated Jan. 30, 2019.
Extended European search report issued in corresponding European application No. 18206899.9 dated May 20, 2019.
Tingxin Yan et al: "Fast app launching for mobile devices using predictive user context", MOBISYS 2012: 10th International Conference on Mobile Systems, Applications and Services, Jan. 1, 2012 (Jan. 1, 2012), p. 113, XP055106616, DOI: 10.1145/2307636. 2307648, ISBN: 978-1-45-031301-8, abstract; figures 3-7; 1. Introduction; 2. Background and Problem Scope; 3. System Overview; 4. Launch Predictor Design.
Rejection issued in corresponding CN application No. 201711396149.6 dated Jun. 18, 2020.

* cited by examiner

METHOD AND DEVICE FOR PRELOADING APPLICATION, STORAGE MEDIUM, AND TERMINAL DEVICE

CROSS-REFERENCE TO RELATED APPLICATION(S)

This application claims priority to Chinese Patent Application No. 201711396149.6, filed on Dec. 21, 2017, the content of which is hereby incorporated by reference in its entirety.

TECHNICAL FIELD

This application relates to the field of computer technology, and particularly to a method for preloading an application, a storage medium, and a terminal device.

BACKGROUND

At present, with rapid development of terminal device technologies, smart devices such as smart phones, tablet computers, and smart televisions have become indispensable electronic devices in people's life.

The terminal device may be installed with various applications (application software, APP). Generally, only when a user opens an application does the application start to be loaded. However, storage space occupied by the application is getting larger and larger, and loading time is getting longer and longer, wasting time of the user. In order to make the applications run more smoothly, some terminal devices can prepare loading resources for some applications in advance, that is, preload some applications in advance.

However, the applications cannot be preloaded at will, because if too many resources are preloaded, they will take up too much storage space and power consumption will become larger, which can affect fluency on the use of the terminal seriously. Therefore, it is important to optimize preloading mechanisms and reduce power consumption of the terminal.

SUMMARY

Implementations of the disclosure provide a method for preloading an application, a storage medium, and a terminal device.

According to a first aspect, a method for preloading an application is provided. The method includes the following.

In response to a target application being detected to be closed, current state feature information of a terminal device is acquired. The current state feature information is compared with historical state feature information of the terminal device when the target application was closed. The historical state feature information corresponds to historical usage regularities of the target application. Target historical state feature information closest to the current state feature information is determined from within the historical state feature information according to a comparison result. The target application is preloaded, in response to determining that the target application is about to be launched again according to a historical usage regularity corresponding to the target historical state feature information.

According to a second aspect, a terminal device is provided. The terminal device includes at least one processor and a computer readable storage. The computer readable storage is coupled to the at least one processor and stores at least one computer executable instruction thereon which, when executed by the at least one processor, causes the at least one processor to carry out the following actions.

In response to a target application being detected to be closed, current state feature information of a terminal device is acquired. The current state feature information is compared with historical state feature information of the terminal device when the target application was closed. The historical state feature information corresponds to historical usage regularities of the target application. Target historical state feature information closest to the current state feature information is determined from within the historical state feature information according to a comparison result. The target application is preloaded, in response to determining that the target application is about to be launched again according to a historical usage regularity corresponding to the target historical state feature information.

According to a third aspect, a non-transitory computer readable storage medium is provided. The non-transitory computer readable storage medium is configured to store a computer program which, when executed by a processor, causes the processor to carry out the following.

In response to a target application being detected to be closed, current state feature information of a terminal device is acquired. The current state feature information is compared with historical state feature information of the terminal device when the target application was closed. The historical state feature information corresponds to historical usage regularities of the target application. Target historical state feature information closest to the current state feature information is determined from within the historical state feature information according to a comparison result. The target application is preloaded, in response to determining that the target application is about to be launched again according to a historical usage regularity corresponding to the target historical state feature information.

DETAILED DESCRIPTION

Figure 1:
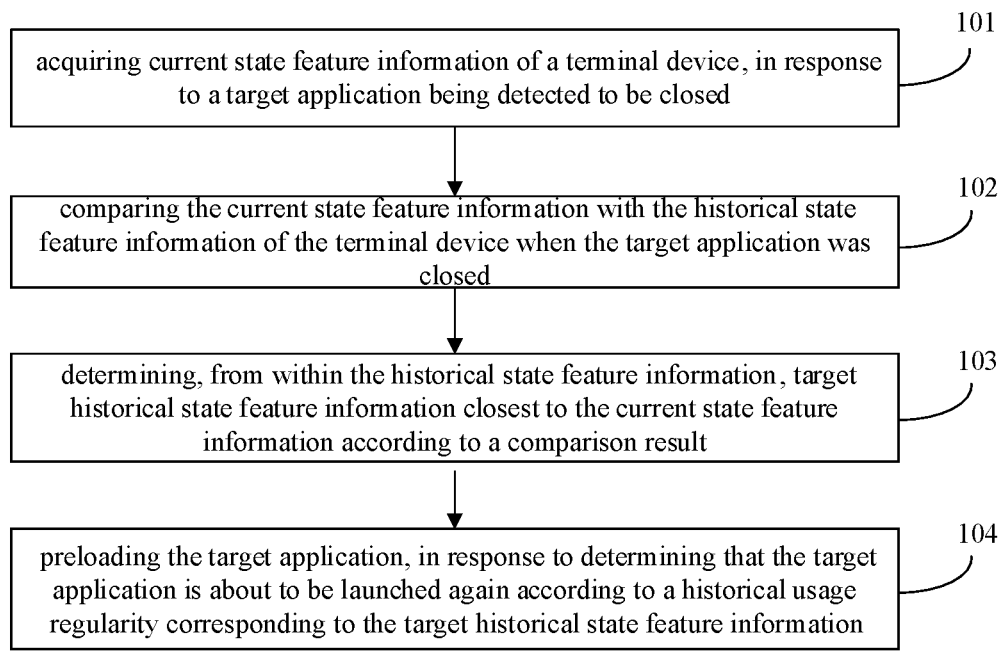
FIG. 1 is a schematic flow chart illustrating a method for preloading an application according to an implementation of the disclosure.

Technical solutions of the disclosure will be further described below through implementations with reference to the accompanying drawings. It will be appreciated that the implementations are described herein for the purpose of explaining the disclosure rather than limiting the disclosure. In addition, it should also be noted that, for the convenience of description, only some rather than all structures related to the disclosure are illustrated in the accompanying drawings.

Before discussing the exemplary implementations in more detail, it should be mentioned that some exemplary implementations are described as processes or methods of a flowchart. In the flowchart, although each step is depicted as being processed sequentially, some of these steps may be performed in parallel, concurrently, or simultaneously. In addition, the order of the steps can be rearranged. The process of one step may be terminated when a corresponding operation is completed, but the implementations may also have additional steps that are not illustrated in the drawings. The process may correspond to a method, a function, a procedure, a subroutine, a subprogram, and the like.

Preloading an application of a terminal device is an effective method for improving user experience. Preparing loading resources for some applications in advance allows the applications to run more smoothly. In the related art, applications are preloaded mainly based on a statistical method. For example, if there are only a few applications that are most frequently used by a user, all these applications will be preloaded. However, there are usually many applications installed in terminal device. For applications that are not frequently used, it does not mean that the user will not use them at present; similarly, for applications that are frequently used, it does not mean that the user will use them at present. Therefore, in the related preloading methods, prediction accuracy of applications to be preloaded is not high and too many resources need to be preloaded, which in turn wasting a lot of storage space and affecting overall performance of the terminal device.

Taking the above into consideration, a method for preloading an application and a terminal device are provided. In the method for preloading the application, in response to a target application being detected to be closed, current state feature information of a terminal device is acquired. Then the current state feature information is compared with historical state feature information of the terminal device when the target application was closed. The historical state feature information corresponds to historical usage regularities of the target application. Thereafter, target historical state feature information closest to the current state feature information is determined from within the historical state feature information according to a comparison result. The target application is preloaded, in response to determining that the target application is about to be launched again according to a historical usage regularity corresponding to the target historical state feature information. Implementations will be detailed below.

FIG. 1 is a schematic flow chart illustrating a method for preloading an application according to an implementation of the disclosure. The method can be implemented by a device for preloading an application. The device can be implemented with software and/or hardware and can be generally integrated into a terminal device. As illustrated in FIG. 1, the method begins at block 101.

At block 101, in response to a target application being detected to be closed, current state feature information of a terminal device is acquired.

For example, the terminal device in the implementation of the disclosure may include a mobile device such as a smart phone, a tablet computer, a notebook computer, and the like.

In the implementation of the disclosure, the target application may be any one of applications installed in the terminal device, or may be an application in a preset application set, which is not limited in this disclosure. The preset application set may not include system applications, and may not include applications that are rarely used by a user. The disclosure does not limit determining manners and the number of applications included in the preset application set. The preset application set may be determined according to usage times and/or usage durations of various applications in a preset time period earlier than the current time, where the preset time period is, for example, one month. If usage times and/or usage durations of some applications exceed corresponding thresholds, these applications will be included in the preset application set. Alternatively, the applications are sorted according to usage times and/or usage durations, and top ranked applications will be included in the preset application set.

In the implementation of the disclosure, "the target application is closed" can include a case where the user actively closes the target application (which may include completely shutting down from the foreground directly, and may also include closing from the background through an application manager or the like). It can further include a case where the target application is cleared or killed by a system. It should be noted that, regarding the manner of which the target application is closed, the implementations of the disclosure are not limited herein. Once the target application is closed, it will not run in the background and its corresponding process will be closed or killed. It should be noted that, at the same time point, there may be multiple target applications being closed. For example, multiple applications are serially killed by the system. In this case, the method for preloading the application of the implementation of the disclosure can be executed in parallel on each of the multiple target applications.

At this operation, when the target application is detected to be closed, the current state feature information of the terminal device is acquired. This is for comparing the current state feature information with historical state feature information and predicting whether the target application will be launched again in a short time according to a historical usage regularity of the target application in subsequent operations. As one implementation, the historical state feature information can be a set of information. The current state feature information and the historical state feature information can be acquired from a memory, a server, and the like.

As one implementation, the state feature information (current state feature information and/or historical state feature information) in the disclosure may include time information, and may also include a switching state of a mobile data network, a connection state of a wireless hotspot, or the like.

The following describes the state feature information including the time information as an example. For the terminal device, at different time points or time periods, usage requirements of the user on applications may be different, so historical usage regularities of target applications may be different as well. The time information is used as a feature (or attribute) of the state feature information. As one implementation, the time information may be a current system time of the terminal device or a time period to which the current system time belongs. The time period may be a certain day of a week (such as Monday or Sunday), or may be a certain time period of a day (such as 6:00 am to 8:00 am). Different time points or different time periods may indicate that the user may be in different states. For example, during working days from Monday to Friday, the user is generally in a working state and often uses office or social applications; during rest days at Saturday, Sunday, and statutory holidays, the user is generally in a leisure state and often uses game or leisure applications. For working days, for example, in a time period from 6:00 am to 8:00 am, the user is generally on the way to work, and may use news clients more frequently; in a time period from 9:00 am to 11:00 am, the user is generally working and may need to use mailbox clients frequently; in a time period from 12:00 noon to 1:00 pm, the user may frequently check progress of order delivery in take-out applications; in a time period from 6:00 pm to 6:10 pm which is an off-work time period, the user may frequently check car information such as the distance in car-hailing application. In addition, schedule information of the user may be acquired, and the time information may be corrected according to the schedule information. For example, if the schedule information indicates that the user is on vacation in a certain Monday, a corresponding working day may be corrected to a rest day.

In order to improve accuracy of the prediction result, more state parameters of the terminal device may be used in the implementation of the disclosure, such as the switching state of the mobile data network and/or the connection state of the wireless hotspot.

Currently, Internet technology is developing rapidly, and many functions of applications of terminal devices rely on the network, such as mobile payment, browsing web pages, watching videos online, and chatting through social applications. This network can be a mobile data network (also known as cellular mobile network) provided by network operators (for example, in China, the network operator can include China Mobile®, China Unicom®, China Telecom®, and the like). This network can also be a wireless local area network (WLAN) based on WLAN technology such as wireless-fidelity (Wi-Fi) technology. This WLAN has the ability to access the Internet, and the terminal device can access the Internet by connecting to a wireless hotspot in the WLAN. For the mobile data network, the user needs to pay a certain data traffic fee to the network operator. Therefore, if the user has an available wireless hotspot (such as a Wi-Fi hotspot) around, she or he generally prefers to connect to the wireless hotspot to access the Internet. In addition, in order to prevent certain applications of the terminal device from consuming traffic without the user's knowledge, many users also choose to turn off the mobile data network. In addition, in the terminal device, different applications require different networking functions, and data traffic consumed during use is also different. Considering the above situations, in the implementation of the disclosure, the switching state of the mobile data network and/or the connection state of the wireless hotspot can be used as features of the state feature information, to improve accuracy of predicting the application to be loaded. For example, when the switching state of the mobile data network is "on", the user may choose to use an application that consumes less traffic. For an application that consumes more traffic, it is usually closed in time after used, to prevent the application from consuming traffic. However, if demands on this application are large, it may be opened very quickly. When the switching state of the mobile data network is "off", the user may not need to close applications frequently.

According to the implementation of the disclosure, the time information, the switching state of the mobile data network, and/or the connection state of the wireless hotspot can be considered, and the states of the terminal device can be divided more precisely, thereby more accurately predicting whether the target application is about to be launched again. It is to be noted that, more features may be included in the state feature information, which is not limited in the disclosure.

Hereinafter, whether to preload the target application is predicted based on the current state feature information and historical state feature information of the terminal device when the target application was closed.

At block 102, the current state feature information is compared with the historical state feature information of the terminal device when the target application was closed.

The historical state feature information corresponds to historical usage regularities of the target application. The historical usage regularities of the target application may include the time to re-launch after the target application is closed, a usage duration after re-launched, the name of other applications or the number of other applications used between the time point of being closed and the time point of being re-launching, and so on. The historical state feature information and the corresponding historical usage regularity of the target application can be collected within a preset collection period. The preset collection period indicates a duration of continuous sample collection, and the sample collection is performed at a preset sampling frequency within the preset collection period. The preset collection period can be determined according to characteristics of the smart terminal, usage requirements of the user, or the like, and is not limited in the disclosure. For example, smart phones, most users will use it almost every day, and thus the preset collection period can be set shorter, such as half a month. When the smart phone is of a relatively large usage intensity (such as being used for a long time per day), the preset collection period can be set even shorter, such as a week. The sampling frequency is not limited in the implementation of the disclosure. As one implementation, the sampling frequency may be determined according to frequency or times of using applications. For example, it may be one time per 3 minutes (1 time/3 mins).

As one implementation, the data collection process in the preset collection period may be performed by a server or a terminal device. When performed by the server, the server may send a sample collecting instruction to the terminal device according to a sampling plan, and the terminal device uploads corresponding data to the server according to the sample collecting instruction. When performed by the terminal device, the terminal device does not need to establish a connection with the server, that is, does not need to have a network access function, and thus timeliness and accuracy of sample collection can be ensured.

As one implementation, before the target application is detected to be closed, the method further includes the following. Collect, in the preset collection period, the historical state feature information of the terminal device at each time point at which the target application is closed, as samples of the target application. Monitor whether the target application is launched within a preset time period starting from the each time point at which the target application is closed. Monitoring results are recorded as sample labels of the samples.

The length of the preset time period may be determined according to a simulation, a test, or the like, and the implementation of the disclosure is not limited. For example, the length of the preset time period is 5 minutes. In the process of collecting sample data, when the target application is closed, historical state feature information at this time point is acquired as a sample collected currently. After the historical state feature information is acquired, a running state of the target application is monitored. Whether the user opens the target application again within the preset time period is recorded, and "launch" or "not launch" is further recorded a sample label corresponding to the sample. For example, if Application 1 is detected to be closed, state feature information acquired is 7:10 am and a connection state of a wireless hotspot is "connected", which form sample 1. If the user opens Application 1 again at 7:14 (assuming the length of the preset time period is 5 minutes), "launch" is recorded as a sample label corresponding to sample 1. If Application 1 is closed again at 7:17 am, the state feature information acquired is 7:17 am and the connection state of the wireless hotspot is "connected", which form sample 2. Then, before 7:22 am, if Application 1 is not launched, "not launch" is recorded as a sample label corresponding to sample 2. If Application 1 is detected to be closed at 6:55 am in the next day, the state feature information acquired is 6:55 am and the connection state of the wireless hotspot is "connected", which form sample 3. If the user then opens Application 1 at 6:58 am, "launch" is recorded as a sample label corresponding to sample 3.

At this operation, the current state feature information acquired is compared with the historical state feature information of the terminal device when the target application was closed. During comparison, all historical state feature information once collected or collected during the preset collection period may be compared with the current state feature information one by one. For the convenience of explanation, the following describes the three samples in the above implementation. As one implementation, when the state feature information includes the time information and the connection state of the wireless hotspot, compare whether the connection state of the wireless hotspot in each sample is the same as the connection state in the current state feature information, and then compare the difference between the time information of each sample and the time information of the current state feature information. In the case where the current time point is 7:12 am and the connection state of the wireless hotspot is "connected", the current state feature information and sample 1 have 2 minutes difference in time, the current state feature information and sample 2 have 5 minutes difference in time, and the current state feature information and sample 3 have 17 minutes difference in time.

At block 103, target historical state feature information closest to the current state feature information is determined from within the historical state feature information according to a comparison result.

As one implementation, a sample closest to the current state feature information can be selected according to the comparison result. As exemplified above, the current state feature information corresponding to the current time point and sample 1 have 2 minutes difference in the time information, the current state feature information corresponding to the current time point and sample 2 have 5 minutes difference in the time information, and the current state feature information corresponding to the current time point and sample 3 have 17 minutes difference in the time information. In this case, sample 1 is the closest sample, and the historical state feature information corresponding to sample 1 can be determined as the target historical state feature information.

At block 104, the target application is preloaded, in response to determining that the target application is about to be launched again according to a historical usage regularity corresponding to the target historical state feature information.

Since the target historical state feature information is closest to the current state feature information, it is most likely to reflect the user's current operation willingness. Whether the target application is about to be launched again is determined according to the historical usage regularity corresponding to the target historical state feature information, and if so, the target application is preloaded. As the above example, sample 1 corresponds to the target historical state feature information, so its corresponding sample label "launch" indicates that the target application is likely to be used by the user in a short time, that is, the user is likely to open the target application again in a short time. In this case, the target application can be preloaded, to speed up launching of the target application when it is launched again.

In this implementation, the process of preloading and data resources preloaded are not limited. For example, the target application can be allocated with corresponding hardware resources and relevant data required for launching can be preloaded based on the hardware resources allocated. In addition, the data resources preloaded can be determined according to the type of the target application. For example, if the target application is a social application, a splash screen, a contact list, recent message records, and the like of this application can be preloaded; if the target application is a game application, data related to game backgrounds of this application and the like can be preloaded.

After the target application is preloaded, if the user really wants to use the target application (for example, clicking an application icon corresponding to the target application), the target application will be triggered to launch. At this time, since all or part of resources required for launching have been preloaded, a speed of launching the target application will be significantly improved, which can reduce waiting time of the user.

According to the method for preloading the application, in response to the target application being detected to be closed, the current state feature information of the terminal device is acquired. The current state feature information is compared with the historical state feature information of the terminal device when the target application was closed. The target historical state feature information closest to the current state feature information is determined from within the historical state feature information according to the comparison result. The target application is preloaded, in response to determining that the target application is about to be launched again according to the historical usage regularity of the target application corresponding to the target historical state feature information. By adopting the above technical solution, after an application is closed, whether the target application is about to be launched again can be predicted, according to a current usage state of the terminal device, matching degrees of states recorded during the use of the user in the past, and corresponding application usage regularities. If the target application is about to be launched again as predicted, the target application is preloaded. It is possible to accurately predict an application to be launched and improve a speed of launching the target application while avoiding wasting the storage space due to blind loading.

In some implementations, the current state feature information of the terminal device is acquired when the target application is detected to be closed as follows. Storage space information of the terminal device is acquired when the target application is detected to be closed. Determine whether remaining storage space reaches a preset storage threshold according to the storage space information. The current state feature information of the terminal device is acquired when the remaining storage space reaches the preset storage threshold. In this way, it can be avoided that, in the case that the storage space of the terminal device is insufficient, if the application is preloaded, resources preloaded may occupy certain storage space and affect an overall operation of the terminal device. Therefore, subsequent operations can be omitted when the remaining storage space does not reach the preset storage threshold, further saving system resources.

In some implementations, the state feature information further includes at least one of: a date category, identity information of a connected wireless hotspot, an application currently running, a previous foreground application, a length of stay of the target application in the background, a time point at which the target application was last switched to the background, a running duration of the target application in the foreground before the target application is closed, plugging and unplugging state of a headphone jack, a charging state, power information of a battery, a display duration of a screen, a movement state of the terminal device, location information, a connection state of a Bluetooth®, and a most recent screen-off duration.

For example, the date category can include working days and rest days, and the rest day may include weekends, and may also include statutory holidays, holidays in the schedule information, or the like. In different types of dates, the user may generally do quite different things, and usage regularities of applications are generally different. Therefore, the date category can also be included as a feature of the state feature information.

When the terminal device is connected to the wireless hotspot, the identity information of the connected wireless hotspot can be further acquired. The identity information can be an identity identifier. Taking Wi-Fi as an example, the identity information can be a service set identifier (SSID) or a basic service set identifier (BSSID). The terminal device may connect to different wireless hotspots, which may indicate that the user is in different environment, such as at home, in the office, or in a public area. In addition, different wireless hotspots may also be divided into public hotspots and personal hotspots, as well as encrypted hotspots and unencrypted hotspots. Considering usage occasion, security, and the like, usage regularities of applications may be different, so the identity information of the connected wireless hotspot can be used as a feature of the state feature information.

In the process of using the terminal device, launching sequences of two or more applications may have a relation. For example, when the user uses Application 1, she or he may use applications such as Application 2, Application 3, and the like for comparison of a product's price. In this implementation, Application 1, Application 2, and Application 3 belong to the same type, such as shopping application. Assuming that the user has closed Application 1, in this case, she or he may open Application 1 again in a short time. Therefore, the application currently running may have an impact on whether the target application is to be re-opened in a short time. The application currently running can include at least one of a foreground running application and a background running application. In the implementation of the disclosure, the application currently running can be used as a feature of the state feature information.

As mentioned above, the launching sequences of two or more applications may have a relation. A previous foreground application (running in a foreground) may have an impact on whether the target application is to be re-launched. In the implementation of the disclosure, the previous foreground application can be used as a feature of the state feature information.

The length of stay of the application in the background, the time point at which the application was last switched to the background, or the running duration of the application in the foreground before the application is closed can reflect usage requirements on the application of the user to a certain extent. Therefore, the length of stay of the target application in the background, the time point at which the target application was last switched to the background, the running duration of the target application in the foreground before the target application is closed, or any combination thereof can be used as a feature of the state feature information.

The terminal device is usually equipped with a headphone jack, and the user can determine whether to listen to sound of the terminal device through the headphone according to usage environment or requirements of listening experience. In general, when the plugging and unplugging state of the headphone jack is plugging, multi-media player-like applications may be used; when the plugging and unplugging state of the headphone jack is unplugging and the terminal device is in a public place, the multi-media player-like applications may not be used and some applications that less play sound will be chosen for use. Considering the above factors, the plugging and unplugging state of the headphone jack can be used as a feature of the state feature information.

Mobile attribute of the terminal device determines that a battery is required to supply power. When the charging state of the terminal device is charging, it may have a certain impact on the use of the terminal device. Generally, the user may not use the terminal device, so applications which are started now are generally more demanded applications. When the charging state of the terminal device is not-charging, the applications used may be unrestricted. Therefore, the charging state can be used as a feature of the state feature information.

The charging state can include charging and not-charging. When the terminal device is charging, the charging state can also include a charging mode. The charging mode may include a fast charging mode and a normal charging mode. The fast charging mode may indicate that the terminal device is charged though a fast charging power adapter (such as a portable power source), and the normal charging mode may indicate that the mobile is charged though a normal charging power adapter (such as an original charger of the terminal device).

When the power of the terminal device is insufficient, in order to extend standby time, the user may not open an application that consumes a large amount of power, such as a video player. When the power of the terminal device is sufficient, applications to be used may not be restricted. Therefore, the power information of the battery can be used as a feature of the state feature information.

The display duration of the screen may refer to a time length when the terminal device remains displayed after lit up. The display duration of the screen may be configured to indicate an accumulative duration of continuous usage of the terminal device. After different usage accumulative durations, operation habits on the target application of the user may be different. For example, in the case that the target application is a video player, when the display duration of the screen reaches an hour, the user may need to rest his or her eyes, and a music player may be opened instead of opening the video player again. In the implementation of the disclosure, the display duration of the screen can be used as a feature of the state feature information. Similarly, the most recent screen-off duration can also be used as a feature of the state feature information.

The movement state of the terminal device may reflect a usage scenario of the terminal device to some extent. In different movement states such as in a running scenario, a driving scenario, a walking scenario, a stationary scenario, and the like, the user may have different usage requirements for applications. For example, the user may need to use a music player to listen to songs while running, need to use a navigation application to navigate while driving, and so on. In addition, the stationary state may also include a posture of the terminal device, such as a tilt angle, etc., which may reflect the state when the user uses the terminal device, such as using at a desktop, using in bed, and the like. In the implementation of the disclosure, the movement state of the terminal device can be used as a feature of the state feature information.

The location information of the terminal device may reflect usage environment of the terminal device to some extent, such as indoors or outdoors, in the office or at home, in a shopping mall, a theater or a tourist attraction, and the like. The user may have different operation habits on the target application at different locations. In the implementation of the disclosure, the location information of the terminal device can be used as a feature of the state feature information.

The connection state of the Bluetooth may include a connected sate and a disconnected state or an off-state of the Bluetooth. In actual use of the terminal device, different connection states of the Bluetooth may correspond to different applications used. In the implementation of the disclosure, the connection state of the Bluetooth can be used as a feature of the state feature information.

The most recent screen-off duration can be understood as a duration from a time point at which the screen was last turned off to a time point at which the screen was lit up. In the implementation of the disclosure, the most recent screen-off duration can be used as a feature of the state feature information.

It should be noted that, each of features of the state feature information is exemplified, to illustrate that different values of any feature may have an effect on the prediction result. However, the above examples will not limit the implementation of the disclosure. The greater the number of features in the state feature information, the more accurate the prediction result. The feature(s) can be selected according to actual situation, and is not limited to the above-listed features.

As one implementation, after the terminal device acquired the current state feature information and the historical state feature information, the terminal device normalizes the current state feature information and the historical state feature information to obtain normalized real numbers. In this way, the information of the current state feature information and the historical state feature information is real numbers, such as normalized real numbers. Values of the features in the sample can be normalized to obtain normalized real numbers, such as normalized to obtain real numbers between 0 and 1, which makes it possible to facilitate the comparison of values of the features and related calculations, thereby reducing calculation amount. For example, convert a value corresponding to each feature into a corresponding serial number, such as converting Wi-Fi SSID "abcd" to NO. 1, converting Wi-Fi SSID "xyz" to NO. 2, and the like, and then perform normalization. Since different features are located in different positions in the sample, serial numbers of different features can be different, or can be multiplexed (for example, the numbers corresponding to both the charging state and the power information of the battery can be NO. 1).

In some implementations, the current state feature information is compared with the historical state feature information of the terminal device when the target application was closed as follows. Distances between the current state feature information and each historical state feature information are calculated. The target historical state feature information closest to the current state feature information is determined from within the historical state feature information according to the comparison result as follows. Historical state feature information corresponding to the smallest distance is determined as target historical state feature information. The target application is preloaded, in response to determining that the target application is about to be launched again as follows. The target application is preloaded, in response to a sample label corresponding to the target historical state feature information indicating "launch". In this way, the current state feature information is compared with each historical state feature information, to determine a historical usage regularity in line with the current state at most, thereby more accurately predicting whether the target application is launched again in a short time. The distances between the current state feature information and each historical state feature information are calculated through a preset scheme. The preset scheme may be any scheme for calculating distances, such as the Euclidean distance calculation scheme or the Mahalanobis distance calculation scheme, etc., which is not limited in the implementation of the disclosure.

In some implementations, after the samples of the target application are collected in the preset collection period, the method further includes the following. The samples collected are divided into a first sample set and a second sample set according to categories of the sample labels. A sample label corresponding to the first sample set indicates "launch" and a sample label corresponding to the second sample set indicates "not launch". First centroid state feature information is obtained by calculating a mean value of values of all state features in the first sample set and second centroid state feature information is obtained by calculating a mean value of values of all state features in the second sample set. The historical state feature information includes the first centroid state feature information and the second centroid state feature information. In this way, the number of the samples for comparison can be reduced effectively.

Furthermore, the current state feature information is compared with the historical state feature information of the terminal device when the target application was closed as follows. A distance between the current state feature information and the first centroid state feature information and a distance between the current state feature information and the second centroid state feature information are calculated. The target historical state feature information closest to the current state feature information is determined from within the historical state feature information according to the comparison result as follows. Centroid state feature information corresponding to a smaller distance is determined as target centroid state feature information. The target application is preloaded, in response to determining that the target application is about to be launched again as follows. The target application is preloaded, in response to a sample label corresponding to the target centroid state feature information indicating "launch". The disclosure will not restrict distance calculation schemes. The distance calculation scheme can be, for example, the Euclidean distance calculation scheme, the Mahalanobis distance calculation scheme, or the like. In this way, by comparing with the two centroid state feature information in distance, a historical usage regularity closest to the current state can be quickly determined and the comparison speed and prediction efficiency can be improved, so that the target application can be preloaded in time.

In some implementations, the target application is preloaded as follows. Remaining storage space of the terminal device is acquired. The target application is preloaded when the remaining storage space is greater than a preset space threshold. In this way, the target application is preloaded, only if the storage space of the terminal device is sufficient, to avoid affecting the overall operation of the terminal device. Optionally, if the storage space is less than or equal to the preset space threshold, the preloading can be suspended; during a set time period, if the remaining storage space increases and is greater than the preset space threshold, the preloading can be started; after the set time period is elapsed, if the remaining storage space is still insufficient, the preloading can be abandoned.

As one implementation, the process of sample collection can be performed in parallel with the prediction process of application preloading. Old parts in the sample set can be deleted periodically, and only the samples in a latest preset collection period are retained to reflect latest usage habits, so as to reduce the calculation amount of prediction operation and to save storage space occupied by the sample set.

Figure 2:
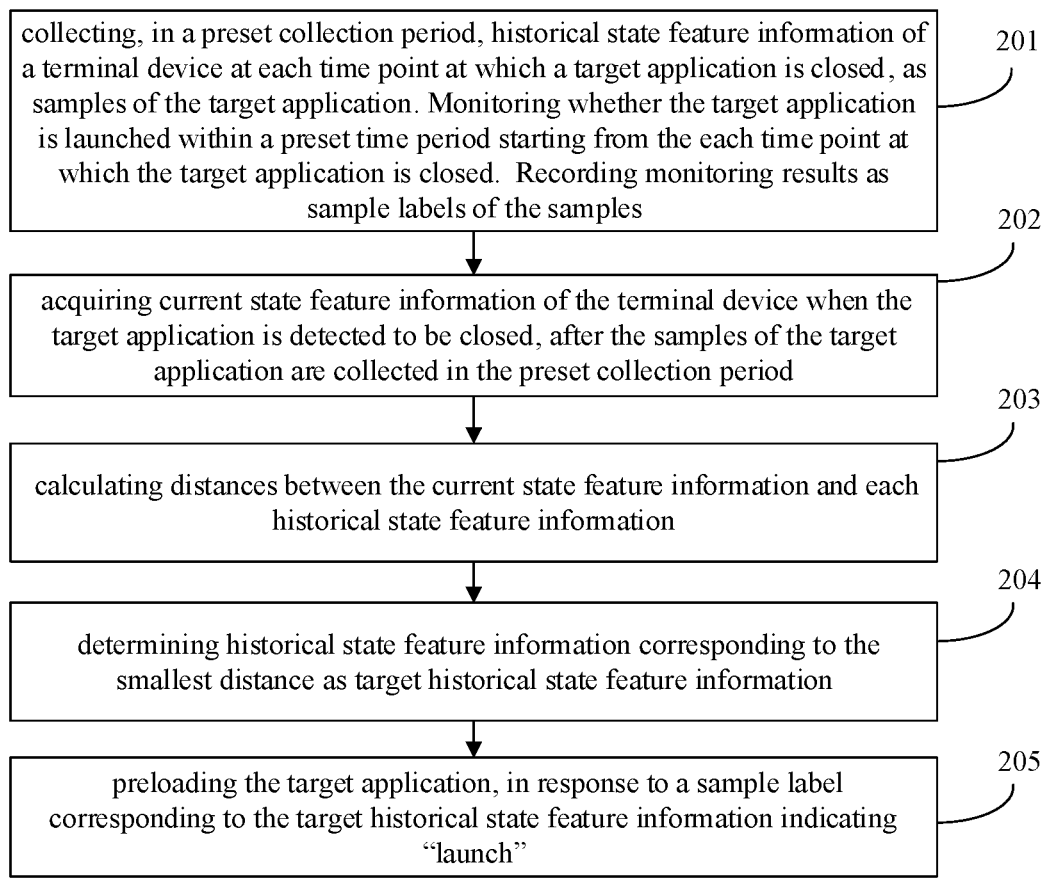
FIG. 2 is a schematic flow chart illustrating another method for preloading an application according to an implementation of the disclosure.

FIG. 2 is a schematic flow chart illustrating another method for preloading an application according to an implementation of the disclosure. As illustrated in FIG. 2, the method begins at block 201.

At block 201, collect, in a preset collection period, historical state feature information of a terminal device at each time point at which a target application is closed, as samples of the target application. Whether the target application is launched is monitored within a preset time period starting from the each time point at which the target application is closed. Monitoring results are recorded as sample labels of the samples.

As one implementation, features of the state feature information (i.e. features of the sample) include at least one of: time information, a date category, a switching state of a mobile data network, a connection state of a wireless hotspot, identity information of a connected wireless hotspot, an application currently running, a previous foreground application, a length of stay of the target application in the background, a time point at which the target application was last switched to the background, a running duration of the target application in the foreground before the target application is closed, plugging and unplugging state of a headphone jack, a charging state, power information of a battery, a display duration of a screen, a movement state of the terminal device, location information, a connection state of a Bluetooth, and a most recent screen-off duration.

For a sample, the values corresponding to different features collected (i.e. feature values) constitute a feature set of the sample. The feature set is recorded by a set of real numbers. Both the feature values and the sample labels are converted into corresponding serial numbers, and then normalized, so that the samples and the corresponding sample labels can be recorded as $(x_1, x_2, \ldots, x_n, y)$. $x_1, x_2, \ldots$, and $x_n$ represent n feature values respectively, which are normalized real numbers (normalized to real numbers from 0 to 1). $x_1, x_2, \ldots$, and $x_n$ can be regarded as a vector for representing a state feature. y refers to a sample label, where "1" indicates "launch" and "0" indicates "not launch". Sample data is continuously collected for one week (preset collection period) to obtain a sample set, that is, a sample database, and then whether the target application is to be preloaded can be predicted based on the sample database.

At block 202, after the samples of the target application are collected in the preset collection period, current state feature information of the terminal device is acquired when the target application is detected to be closed.

As one implementation, the current state feature information can be represented as a state feature vector: $x_1^0$, $x_2^0, \ldots, x_n^0$. Items contained in the current state feature information correspond to the features contained in the sample.

At block 203, distances between the current state feature information and each historical state feature information are calculated.

As one implementation, all sample data is selected from the sample set, and then compared with the current state feature information. For a vector i, $(x_1, x_2, \ldots, x_n, y)$ corresponding to each sample, Euclidean distance $y^i$ between the current state feature information and the sample is calculated through the formula $$y^i = \sqrt{(x_1-x_1^0)^2+(x_2-x_2^0)^2+\ldots+(x_n-x_n^0)^2}.$$

At block 204, historical state feature information corresponding to the smallest distance is determined as target historical state feature information.

As one implementation, the multiple $y^i$ calculated are sorted in an ascending order, and then historical state feature information corresponding to a top ranked $y^i$ is selected as the target historical state feature information, that is, the target sample.

At block 205, the target application is preloaded, in response to a sample label corresponding to the target historical state feature information indicating "launch".

As one implementation, the sample label corresponding to the target sample is obtained, and if the sample label is "1", the target application is preloaded. As one implementation, in the case of sufficient memory, data corresponding to the target application is loaded into the memory in advance.

According to the method for preloading the application of the implementation of the disclosure, the samples include data with multiple dimensions, which can comprehensively reflect the usage habits. When the target application is closed, whether the target application is to be opened again in a short time can be accurately predicted according to the user's usage habits. If the target application is to be opened again, the target application is preloaded in advance. As a result, a speed of launching the target application can be improved while avoiding wasting the storage space due to blind loading.

Figure 3:
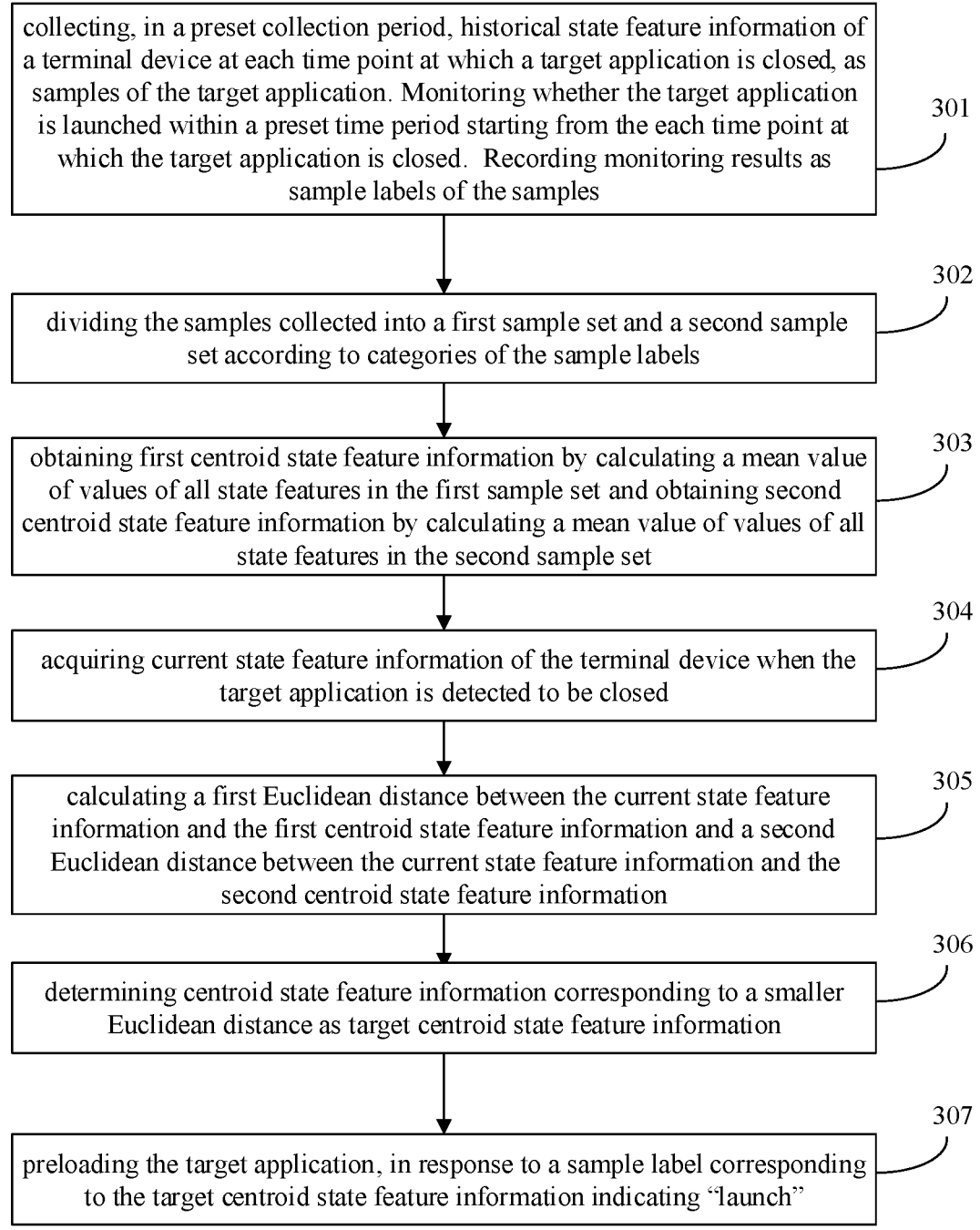
FIG. 3 is a schematic flow chart illustrating yet another method for preloading an application according to an implementation of the disclosure.

FIG. 3 is a schematic flow chart illustrating yet another method for preloading an application according to an implementation of the disclosure. As illustrated in FIG. 3, the method begins at block 301.

At block 301, collect, in a preset collection period, historical state feature information of a terminal device at each time point at which a target application is closed, as samples of the target application. Whether the target application is launched is monitored within a preset time period starting from the each time point at which the target application is closed. Monitoring results are recorded as sample labels of the samples.

As one implementation, features of the state feature information (i.e. features of the sample) include at least one of: time information, a date category, a switching state of a mobile data network, a connection state of a wireless hotspot, identity information of a connected wireless hotspot, an application currently running, a previous foreground application, a length of stay of the target application in the background, a time point at which the target application was last switched to the background, a running duration of the target application in the foreground before the target application is closed, plugging and unplugging state of a headphone jack, a charging state, power information of a battery, a display duration of a screen, a movement state of the terminal device, location information, a connection state of a Bluetooth, and a most recent screen-off duration.

For a sample, the values corresponding to different features collected (i.e. feature values) constitute a feature set of the sample. The feature set is recorded by a set of real numbers. Both the feature values and the sample labels are converted into corresponding serial numbers, and then normalized, so that the samples and the corresponding sample labels can be recorded as $(x_1, x_2, \ldots, x_n, y)$. $x_1, X_2, \ldots,$ and $x_n$ represent n feature values respectively, which are normalized real numbers (normalized to real numbers from 0 to 1). $x_1, x_2, \ldots,$ and $x_n$ can be regarded as a vector for representing a state feature. y refers to a sample label, where "1" indicates "launch" and "0" indicates "not launch".

At block 302, the samples collected are divided into a first sample set and a second sample set according to categories of the sample labels.

A sample label corresponding to the first sample set indicates "launch" and a sample label corresponding to the second sample set indicates "not launch". Assuming that the total number of the samples collected is K, the samples collected can be classified according to the value of y of "0" or "1". After classification, the number of samples in the first sample set is a, and the number of samples in the second sample set is b, where K=a+b.

At block 303, first centroid state feature information is obtained by calculating a mean value of values of all state features in the first sample set and second centroid state feature information is obtained by calculating a mean value of values of all state features in the second sample set.

A feature vector corresponding to the first centroid state feature information can be obtained via the formula:

$$\left(\frac{x_1^{(1)} + x_1^{(2)} + \ldots + x_1^{(a)}}{a}, \frac{x_2^{(1)} + x_2^{(2)} + \ldots + x_2^{(a)}}{a}, \ldots, \frac{x_n^{(1)} + x_n^{(2)} + \ldots + x_n^{(a)}}{a}\right).$$

A feature vector corresponding to the second centroid state feature information can be obtained via the formula:

$$\left(\frac{x_1^{(1)} + x_1^{(2)} + \ldots + x_1^{(b)}}{b}, \frac{x_2^{(1)} + x_2^{(2)} + \ldots + x_2^{(b)}}{b}, \ldots, \frac{x_n^{(1)} + x_n^{(2)} + \ldots + x_n^{(b)}}{b}\right).$$

The first centroid state feature information can be represented as $(x^a_1, x^a_2, \ldots, x^a_n)$ and the second centroid state feature information can be represented as $(x^b_1, x^b_2, \ldots x^b_n)$.

At block 304, current state feature information of the terminal device is acquired when the target application is detected to be closed.

As one implementation, the current state feature information can be represented as a state feature vector: $x_1^0, x_2^0, \ldots, x_n^0$. Items contained in the current state feature information correspond to the features contained in the sample.

At block 305, a first Euclidean distance between the current state feature information and the first centroid state feature information and a second Euclidean distance between the current state feature information and the second centroid state feature information are calculated.

The first Euclidean distance $y^1$ can be calculated through the formula $$y^1 = \sqrt{(x^a_1 - x_1^0)^2 + (x^a_2 - x_2^0)^2 + \ldots + (x^a_n - x_n^0)^2}.$$

The second Euclidean distance $y^2$ can be calculated through the formula $$y^2 = \sqrt{(x^b_1 - x_1^0)^2 + (x^b_2 - x_2^0)^2 + \ldots + (x^b_n - x_n^0)^2}.$$

At block 306, centroid state feature information corresponding to a smaller Euclidean distance is determined as target centroid state feature information.

At block 307, the target application is preloaded, in response to a sample label corresponding to the target centroid state feature information indicating "launch".

As one implementation, the sample label corresponding to the target sample is obtained, and if the sample label is "1", the target application is preloaded. As one implementation, in the case of sufficient memory, data corresponding to the target application is loaded into the memory in advance.

According to the method for preloading the application of the implementation of the disclosure, the samples include data with multiple dimensions, which can comprehensively reflect the usage habits. When the target application is closed, whether the target application is to be opened again in a short time can be accurately predicted according to the user's usage habits. If the target application is to be opened again, the target application is preloaded in advance. Consequently, it is possible to improve a speed of launching the target application while avoiding wasting the storage space due to blind loading.

Figure 4:
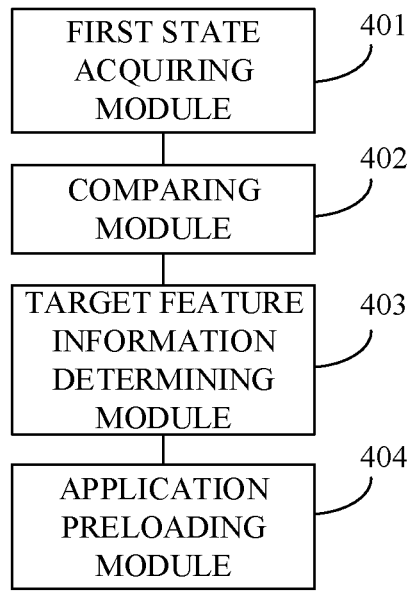
FIG. 4 is a schematic structural diagram illustrating a device for preloading an application according to an implementation of the disclosure.

FIG. 4 is a schematic structural diagram illustrating a device for preloading an application according to an implementation of the disclosure. The device can be implemented with software and/or hardware and can be generally integrated in a terminal. The device can preload an application of the terminal device by executing the method for preloading the application. As illustrated in FIG. 4, the device includes a first state acquiring module 401, a comparing module 402, a target feature information determining module 403, and an application preloading module 404.

The first state acquiring module 401 is configured to acquire current state feature information of a terminal device, in response to a target application being detected to be closed. The comparing module 402 is configured to compare the current state feature information with historical state feature information of the terminal device when the target application was closed. The historical state feature information corresponds to historical usage regularities of the target application. The target feature information determining module 403 is configured to determine, from within the historical state feature information, target historical state feature information closest to the current state feature information according to a comparison result. The application preloading module 404 is configured to preload the target application, in response to determining that the target application is about to be launched again according to a historical usage regularity corresponding to the target historical state feature information.

According to the device for preloading the application, in response to the target application being detected to be closed, the current state feature information of the terminal device is acquired. The current state feature information is compared with the historical state feature information of the terminal device when the target application was closed. The target historical state feature information closest to the current state feature information is determined from within the historical state feature information according to the comparison result. The target application is preloaded, in response to determining that the target application is about to be launched again according to the historical usage regularity of the target application corresponding to the target historical state feature information. By adopting the above technical solution, after an application is closed, whether the target application is about to be launched again can be predicted, according to a current usage state of the terminal device, matching degrees of states recorded during the use of the user in the past, and corresponding application usage regularities. If the target application is about to be launched again as predicted, the target application is preloaded. It is possible to accurately predict an application to be launched and improve a speed of launching the target application while avoiding wasting the storage space due to blind loading.

As one implementation, the device further includes a sample collecting module. The sample collecting module is configured to collect, in a preset collection period, before the target application is detected to be closed, the historical state feature information of the terminal device at each time point at which the target application is closed, as samples of the target application, to monitor whether the target application is launched within a preset time period starting from the each time point at which the target application is closed, and to record monitoring results as sample labels of the samples.

As one implementation, the comparing module 402 is configured to calculate distances between the current state feature information and each historical state feature information. The target feature information determining module 403 is configured to determine historical state feature information corresponding to the smallest distance as target historical state feature information. The application preloading module 404 is configured to preload the target application, in response to a sample label corresponding to the target historical state feature information indicating "launch".

As one implementation, the device further includes a sample dividing module and a centroid feature information obtaining module. The sample dividing module is configured to divide, after the samples of the target application are collected in the preset collection period, the samples collected into a first sample set and a second sample set according to categories of the sample labels, where a sample label corresponding to the first sample set indicates "launch" and a sample label corresponding to the second sample set indicates "not launch". The centroid feature information obtaining module is configured to obtain first centroid state feature information by calculating a mean value of values of all state features in the first sample set and obtain second centroid state feature information by calculating a mean value of values of all state features in the second sample set, where the historical state feature information includes the first centroid state feature information and the second centroid state feature information.

As one implementation, the comparing module 402 is configured to calculate a distance between the current state feature information and the first centroid state feature information and a distance between the current state feature information and the second centroid state feature information. The target feature information determining module 403 is configured to determine centroid state feature information corresponding to a smaller distance as target centroid state feature information. The application preloading module 404 is configured to preload the target application, in response to a sample label corresponding to the target centroid state feature information indicating "launch".

As one implementation, the application preloading module 404 is configured to acquire remaining storage space of the terminal device and to preload the target application when the remaining storage space is greater than a preset space threshold.

As one implementation, the current state feature information and the historical state feature information each include at least one of: time information, a date category, a switching state of a mobile data network, a connection state of a wireless hotspot, identity information of a connected wireless hotspot, an application currently running, a previous foreground application, a length of stay of the target application in the background, a time point at which the target application was last switched to the background, a running duration of the target application in the foreground before the target application is closed, plugging and unplugging state of a headphone jack, a charging state, power information of a battery, a display duration of a screen, a movement state of the terminal device, location information, a connection state of a Bluetooth, and a most recent screen-off duration.

It is to be noted that, the device described in the device implementations of the disclosure is presented in the form of functional modules. The term "module" used herein should be understood as the broadest meaning as possible, and an object for implementing functions defined by each "module" may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

Implementations of the disclosure also provide a non-transitory computer readable storage medium. The non-transitory computer readable storage medium includes computer executable instructions, and the computer executable instructions are used for executing a method for preloading an application when executed by a computer processor. The method includes the following.

In response to a target application being detected to be closed, current state feature information of a terminal device is acquired. The current state feature information is compared with historical state feature information of the terminal device when the target application was closed. The historical state feature information corresponds to historical usage regularities of the target application. Target historical state feature information closest to the current state feature information is determined from within the historical state feature information according to a comparison result. The target application is preloaded, in response to determining that the target application is about to be launched again according to a historical usage regularity corresponding to the target historical state feature information.

The non-transitory computer readable storage medium refers to any of various types of memory devices or storage devices. The term "non-transitory computer readable storage medium" is intended to include: a mounting medium such as a compact disc read-only memory (CD-ROM), a floppy disk, or a tape device; computer system memory or random access memory such as a dynamic random access memory (DRAM), a display data random access memory (DDR-RAM), a static random access memory (SRAM), an extended data output random access memory (EDORAM) and a Rambus random access memory (Rambus RAM); non-transitory memory such as a flash memory and a magnetic medium (such as a hard disk or an optical memory); a register and other similar types of memory element, and the like. The non-transitory computer readable storage medium may also include other types of memory or a combination thereof. In addition, the non-transitory computer readable storage medium may be located in a first computer system in which a program is executed, or may be located in a second computer system coupled to the first computer system via a network, such as the Internet. The second computer system can provide program instructions to the first computer for execution. The term "non-transitory computer readable storage medium" can include two or more storage media that can reside in different locations (e.g. different computer systems connected through a network). The non-transitory computer readable storage medium may store program instructions (e.g. computer programs) executable by one or more processors.

In the implementations of the disclosure, the computer executable instructions contained in the non-transitory computer readable storage medium are not limited to executing the operations of preloading the application as described above, and can also execute relevant operations of the method for preloading the application according to the implementations of the disclosure.

Figure 5:
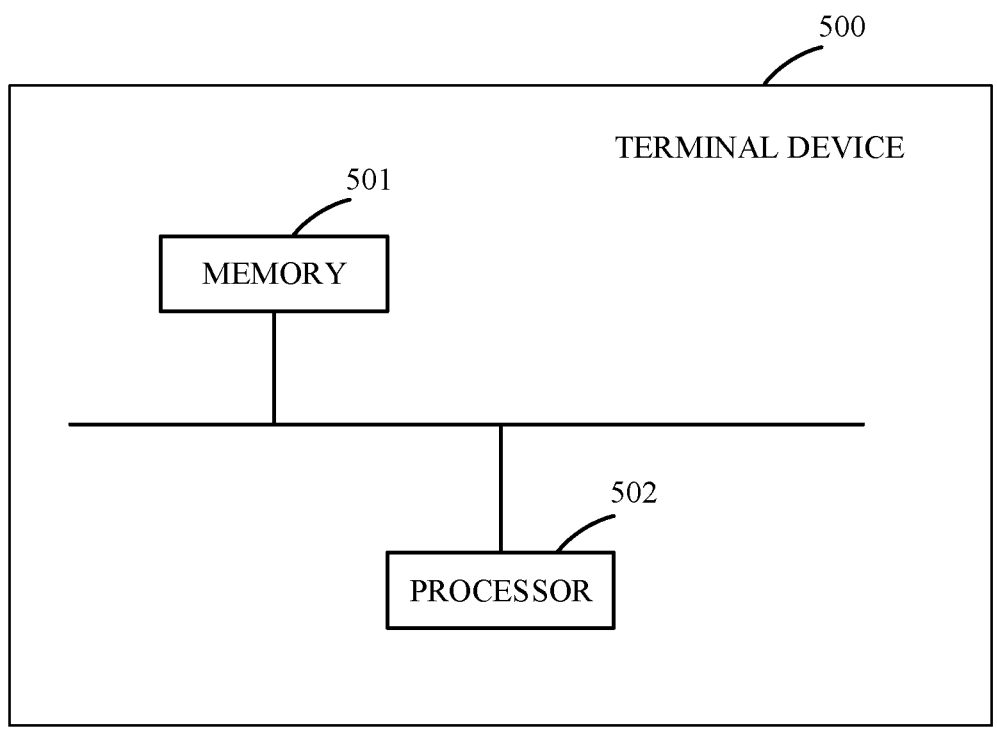
FIG. 5 is a schematic structural diagram illustrating a terminal device according to an implementation of the disclosure.

Implementations of the disclosure provide a terminal device. The device for preloading the application of the implementations of the disclosure can be integrated into the terminal device. FIG. 5 is a schematic structural diagram illustrating the terminal device according to an implementation of the disclosure. The terminal device 500 includes at least one processor 501 and a computer readable storage 502, coupled to the at least one processor 501 and storing at least one computer executable instruction thereon which, when executed by the at least one processor, causes the at least one processor 501 to carry out the following actions.

In response to a target application being detected to be closed, current state feature information of a terminal device is acquired. The current state feature information is compared with historical state feature information of the terminal device when the target application was closed. The historical state feature information corresponds to historical usage regularities of the target application. Target historical state feature information closest to the current state feature information is determined from within the historical state feature information according to a comparison result. The target application is preloaded, in response to determining that the target application is about to be launched again according to a historical usage regularity corresponding to the target historical state feature information.

As one implementation, the at least one processor 501 is further configured to collect, in a preset collection period, before the target application is detected to be closed, the historical state feature information of the terminal device at each time point at which the target application is closed, as samples of the target application, to monitor whether the target application is launched within a preset time period starting from the each time point at which the target application is closed, and to record monitoring results as sample labels of the samples.

As one implementation, the at least one processor 501 configured to carry out the comparing the current state feature information with historical state feature information of the terminal device when the target application was closed is configured to: calculate distances between the current state feature information and each historical state feature information. The at least one processor 501 configured to carry out the determining, from within the historical state feature information, target historical state feature information closest to the current state feature information according to a comparison result is configured to: determine historical state feature information corresponding to the smallest distance as target historical state feature information. The at least one processor 501 configured to carry out the preloading the target application, in response to determining that the target application is about to be launched again is configured to: preload the target application, in response to a sample label corresponding to the target historical state feature information indicating "launch".

As one implementation, the at least one processor 501 is further configured to: divide the samples collected into a first sample set and a second sample set according to categories of the sample labels, where a sample label corresponding to the first sample set indicates "launch" and a sample label corresponding to the second sample set indicates "not launch", and obtain first centroid state feature information by calculating a mean value of values of all state features in the first sample set and obtain second centroid state feature information by calculating a mean value of values of all state features in the second sample set, where the historical state feature information includes the first centroid state feature information and the second centroid state feature information.

As one implementation, the at least one processor 501 configured to carry out the comparing the current state feature information with historical state feature information of the terminal device when the target application was closed is configured to: calculate a distance between the current state feature information and the first centroid state feature information and a distance between the current state feature information and the second centroid state feature information. The at least one processor 501 configured to carry out the determining, from within the historical state feature information, target historical state feature information closest to the current state feature information according to a comparison result is configured to: determine centroid state feature information corresponding to a smaller distance as target centroid state feature information. The at least one processor 501 configured to carry out the preloading the target application, in response to determining that the target application is about to be launched again is configured to: preload the target application, in response to a sample label corresponding to the target centroid state feature information indicating "launch".

As one implementation, the at least one processor 501 configured to carry out the preloading the target application is configured to: acquire remaining storage space of the terminal device, and preload the target application when the remaining storage space is greater than a preset space threshold.

As one implementation, the current state feature information and the historical state feature information each include at least one of: time information, a date category, a switching state of a mobile data network, a connection state of a wireless hotspot, identity information of a connected wireless hotspot, an application currently running, a previous foreground application, a length of stay of the target application in the background, a time point at which the target application was last switched to the background, a running duration of the target application in the foreground before the target application is closed, plugging and unplugging state of a headphone jack, a charging state, power information of a battery, a display duration of a screen, a movement state of the terminal device, location information, a connection state of a Bluetooth, and a most recent screen-off duration.

According to the terminal device of the implementation of the disclosure, after an application is closed, whether the target application is about to be launched again can be predicted, according to a current usage state of the terminal device, matching degrees of states recorded during the use of the user in the past, and corresponding application usage regularities. If the target application is about to be launched again as predicted, the target application is preloaded. It is possible to accurately predict an application to be launched and improve a speed of launching the target application while avoiding wasting the storage space due to blind loading.

Figure 6:
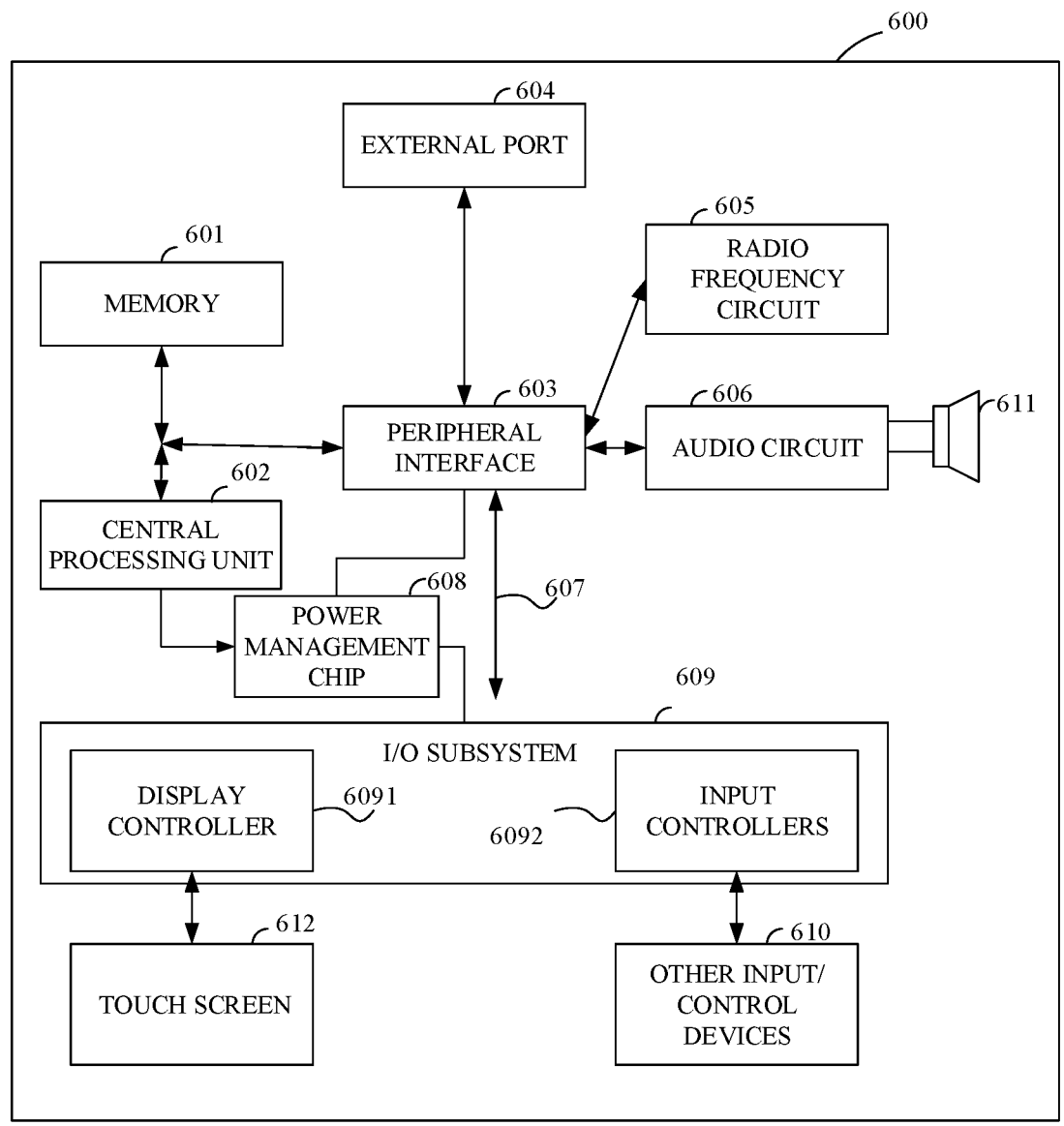
FIG. 6 is a schematic structural diagram illustrating another terminal device according to an implementation of the disclosure.

FIG. 6 is a schematic structural diagram illustrating another terminal device according to an implementation of the disclosure. As illustrated in FIG. 6, the terminal device includes a housing (not illustrated), a memory 601, and a central processing unit (CPU) 602 (also referred to as a processor, hereinafter CPU for short), a circuit board (not illustrated), and a power supply circuit (not illustrated). The circuit board is disposed inside a space defined by the housing. The CPU 602 and the memory 601 are disposed on the circuit board. The power supply circuit is configured to supply power for each circuit or component of the terminal. The memory 601 is configured to store executable program codes. The CPU 602 is configured to run a computer program corresponding to the executable program codes by reading the executable program codes stored in the memory 601 to carry out the following operations.

Current state feature information of a terminal device is acquired, when a target application is detected to be closed. The current state feature information is input into a random forest prediction model corresponding to the target application, where the random forest prediction model is generated based on a usage regularity of the target application corresponding to historical state feature information of the terminal device. Whether to preload the target application is determined according to an output result of the random forest prediction model.

The terminal further includes a peripheral interface 603, an radio frequency (RF) circuit 605, an audio circuit 606, a speaker 611, a power management chip 608, an input/output (I/O) subsystem 609, other input/control devices 610, a touch screen 612, other input/control devices 610, and an external port 604, which are communicated via one or more communication buses or signal lines 607.

It should be understood that, the terminal 600 illustrated is exemplary and the terminal 600 may have more or fewer components than those illustrated in FIG. 6. For example, two or more components may be combined, or different component configurations can be adopted in the terminal. The various components illustrated in FIG. 6 can be implemented in hardware, software, or a combination of hardware and software including one or more signal processing and/or application specific integrated circuits.

The following describes a mobile phone as an example of the terminal device for preloading an application.

The memory 601 is accessible by the CPU 602, the peripheral interface 603 and so on. The memory 601 may include a high-speed random access memory and may further include a non-transitory memory such as one or more magnetic disk storage devices, flash memory devices, or other transitory solid-state memory devices.

The peripheral interface 603 is configured to connect the input and output peripherals of the device to the CPU 602 and the memory 601.

The I/O subsystem 609 is configured to connect the input and the output peripherals such as the touch screen 612 and other input/control devices 610 to the peripheral interface 603. The I/O subsystem 609 may include a display controller 6091 and one or more input controllers 6092 configured to control other input/control devices 610. The one or more input controllers 6092 are configured to receive electrical signals from or send electrical signals to other input/control devices 610, where other input/control devices 610 may include a physical button (a press button, a rocker button, etc.), a dial, a slide switch, a joystick, or a click wheel. It should be noted that the input controller 6092 can be coupled with any of a keyboard, an infrared port, a universal serial bus (USB) interface, and a pointing apparatus such as a mouse.

The touch screen 612 functions as an input interface and an output interface between a terminal and a user, and is configured to display a visual output to the user. The visual output may include graphics, text, icons, videos, and the like.

The display controller 6091 in the I/O subsystem 609 is configured to receive an electrical signal from or send an electrical signal to the touch screen 612. The touch screen 612 is configured to detect contact or touch on the touch screen. The display controller 6091 is configured to convert the contact detected into an interaction with a user interface object displayed on the touch screen 612, that is, to realize human-computer interaction. The user interface object displayed on the touch screen 612 may be an icon of a running game, an icon indicating connection to corresponding networks, and the like. It should be noted that, the device may also include a light mouse, which is a touch sensitive surface that does not display a visual output, or can be an extension of a touch sensitive surface formed by the touch screen.

The RF circuit 605 is configured to establish communication between a mobile phone and the wireless network (i.e. network side) and to transmit and receive data between the mobile phone and the wireless network, for example, transmit and receive short messages, emails, and the like. The RF circuit 605 is configured to receive and transmit RF signals (also known as electromagnetic signals), to convert an electrical signal into an electromagnetic signal or convert an electromagnetic signal into an electrical signal, and to communicate with a communication network and other devices through electromagnetic signals. The RF circuit may include known circuits for performing these functions, including but not limited to an antenna system, an RF transceiver, one or more amplifiers, a tuner, one or more oscillators, a digital signal processor, a coder-decoder (CODEC) chipset, a subscriber identity module (SIM) and so on.

The audio circuit 606 is configured to receive audio data from the peripheral interface 603, to convert the audio data into an electric signal, and to transmit the electric signal to the speaker 611.

The speaker 611 is configured to restore the voice signal received by the mobile phone from the wireless network via the RF circuit 605 to sound and to play the sound to the user.

The power management chip 608 is configured for power supply and power management of the hardware connected to the CPU 602, the I/O subsystem 609, and the peripheral interfaces 603.

The device for preloading the application, the non-transitory computer readable storage medium, and the terminal device of the above implementations have corresponding functional modules and can execute the corresponding method for preloading the application, and thus each contributes to advantageous effects of executing the method. For technical details not described herein, reference may be made to the description of the method for preloading the application.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for preloading an application, comprising:
collecting, in a preset collection period, historical state feature information of a terminal device at each time point at which a target application is closed, as samples of the target application;
monitoring whether the target application is launched within a preset time period starting from the each time point at which the target application is closed;
recording monitoring results as sample labels of the samples;
acquiring current state feature information of the terminal device, in response to the target application being detected to be closed;
comparing the current state feature information with the historical state feature information of the terminal device when the target application was closed, the historical state feature information corresponding to historical usage regularities of the target application;
determining, from within the historical state feature information, target historical state feature information closest to the current state feature information according to a comparison result; and
preloading the target application, in response to determining that the target application is about to be launched again according to a historical usage regularity corresponding to the target historical state feature information;
wherein comparing the current state feature information with the historical state feature information of the terminal device when the target application was closed comprises calculating distances between the current state feature information and each of the historical state feature information;
wherein determining, from within the historical state feature information, the target historical state feature information closest to the current state feature information according to the comparison result comprises determining historical state feature information corresponding to the smallest distance as target historical state feature information; and
wherein preloading the target application, in response to determining that the target application is about to be launched again comprises preloading the target application, in response to a sample label corresponding to the target historical state feature information indicating "launch".

2. The method of claim 1, further comprising:
after collecting, in the preset collection period, samples of the target application:
dividing the samples collected into a first sample set and a second sample set according to categories of the sample labels, wherein a sample label corresponding to the first sample set indicates "launch" and a sample label corresponding to the second sample set indicates "not launch"; and
obtaining first centroid state feature information by calculating a mean value of values of all state features in the first sample set and obtaining second centroid state feature information by calculating a mean value of values of all state features in the second sample set, wherein the historical state feature information comprises the first centroid state feature information and the second centroid state feature information.

3. The method of claim 2, wherein
comparing the current state feature information with the historical state feature information of the terminal device when the target application was closed comprises calculating a distance between the current state feature information and the first centroid state feature information and a distance between the current state feature information and the second centroid state feature information;
determining, from within the historical state feature information, the target historical state feature information closest to the current state feature information according to the comparison result comprises determining centroid state feature information corresponding to a smaller distance as target centroid state feature information; and
preloading the target application, in response to determining that the target application is about to be launched again comprises preloading the target application, in response to a sample label corresponding to the target centroid state feature information indicating "launch".

4. The method of claim 1, wherein preloading the target application comprises:
acquiring remaining storage space of the terminal device; and
preloading the target application when the remaining storage space is greater than a preset space threshold.

5. The method of claim 1, wherein the current state feature information and the historical state feature information each comprise at least one of: time information, a date category, a switching state of a mobile data network, a connection state of a wireless hotspot, identity information of a connected wireless hotspot, an application currently running, a previous foreground application, a length of stay of the target application in background, a time point at which the target application was last switched to the background, a running duration of the target application in foreground before the target application is closed, plugging and unplugging state of a headphone jack, a charging state, power information of a battery, a display duration of a screen, a movement state of the terminal device, location information, a connection state of a Bluetooth, and a most recent screen-off duration.

6. A terminal device, comprising:
at least one processor; and
a computer readable storage, coupled to the at least one processor and storing at least one computer executable instruction thereon which, when executed by the at least one processor, causes the at least one processor to:
collect, in a preset collection period, historical state feature information of a terminal device at each time point at which a target application is closed, as samples of the target application;
monitor whether the target application is launched within a preset time period starting from the each time point at which the target application is closed;
record monitoring results as sample labels of the samples;
acquire current state feature information of the terminal device, in response to the target application being detected to be closed;

compare the current state feature information with the historical state feature information of the terminal device when the target application was closed, the historical state feature information corresponding to historical usage regularities of the target application;

determine, from within the historical state feature information, target historical state feature information closest to the current state feature information according to a comparison result; and preload the target application, in response to determining that the target application is about to be launched again according to a historical usage regularity corresponding to the target historical state feature information;

wherein the at least one computer executable instruction to compare the current state feature information with the historical state feature information of the terminal device when the target application was closed causes the at least one processor to calculate distances between the current state feature information and each historical state feature information;

wherein the at least one computer executable instruction to determine, from within the historical state feature information, the target historical state feature information closest to the current state feature information according to the comparison result causes the at least one processor to determine historical state feature information corresponding to the smallest distance as target historical state feature information; and wherein the at least one computer executable instruction to preload the target application, in response to determining that the target application is about to be launched again causes the at least one processor to preload the target application, in response to a sample label corresponding to the target historical state feature information indicating "launch".

7. The terminal device of claim 6, wherein the at least one computer executable instructions, when executed by the at least one processor, further cause the at least one processor to:

divide the samples collected into a first sample set and a second sample set according to categories of the sample labels, wherein a sample label corresponding to the first sample set indicates "launch" and a sample label corresponding to the second sample set indicates "not launch"; and obtain first centroid state feature information by calculating a mean value of values of all state features in the first sample set and obtain second centroid state feature information by calculating a mean value of values of all state features in the second sample set, wherein the historical state feature information comprises the first centroid state feature information and the second centroid state feature information.

8. The terminal device of claim 7, wherein the at least one computer executable instruction to compare the current state feature information with the historical state feature information of the terminal device when the target application was closed causes the at least one processor to calculate a distance between the current state feature information and the first centroid state feature information and a distance between the current state feature information and the second centroid state feature information;

the at least one computer executable instruction to determine, from within the historical state feature information, the target historical state feature information closest to the current state feature information according to the comparison result causes the at least one processor to determine centroid state feature information corresponding to a smaller distance as target centroid state feature information; and the at least one computer executable instruction to preload the target application, in response to determine that the target application is about to be launched again causes the at least one processor to preload the target application, in response to a sample label corresponding to the target centroid state feature information indicating "launch".

9. The terminal device of claim 6, wherein the at least one computer executable instruction that causes the at least one processor to preload the target application further causes the at least one processor to:

acquire remaining storage space of the terminal device; and preload the target application when the remaining storage space is greater than a preset space threshold.

10. The terminal device of claim 6, wherein the current state feature information and the historical state feature information each comprise at least one of: time information, a date category, a switching state of a mobile data network, a connection state of a wireless hotspot, identity information of a connected wireless hotspot, an application currently running, a previous foreground application, a length of stay of the target application in background, a time point at which the target application was last switched to the background, a running duration of the target application in foreground before the target application is closed, plugging and unplugging state of a headphone jack, a charging state, power information of a battery, a display duration of a screen, a movement state of the terminal device, location information, a connection state of a Bluetooth, and a most recent screen-off duration.

11. A non-transitory computer readable storage medium storing a computer program which, when executed by a processor, causes the processor to:

collect, in a preset collection period, historical state feature information of a terminal device at each time point at which a target application is closed, as samples of the target application;

monitor whether the target application is launched within a preset time period starting from the each time point at which the target application is closed;

record monitoring results as sample labels of the samples;

acquire current state feature information of the terminal device, in response to the target application being detected to be closed;

compare the current state feature information with the historical state feature information of the terminal device when the target application was closed; the historical state feature information corresponding to historical usage regularities of the target application;

determine, from within the historical state feature information, target historical state feature information closest to the current state feature information according to a comparison result; and preload the target application, in response to determining that the target application is about to be launched again according to a historical usage regularity corresponding to the target historical state feature information;

wherein the computer program to compare the current state feature information with the historical state feature information of the terminal device when the target application was closed causes the processor to calculate distances between the current state feature information and each historical state feature information;

wherein the computer program to determine, from within the historical state feature information, the target historical state feature information closest to the current state feature information according to the comparison result causes the processor to determine historical state feature information corresponding to the smallest distance as target historical state feature information; and wherein the computer program to preload the target application, in response to determining that the target application is about to be launched again causes the processor to preload the target application, in response to a sample label corresponding to the target historical state feature information indicating "launch".

12. The non-transitory computer readable storage medium of claim 11, wherein the computer program further causes the processor to:

divide the samples collected into a first sample set and a second sample set according to categories of the sample labels, wherein a sample label corresponding to the first sample set indicates "launch" and a sample label corresponding to the second sample set indicates "not launch"; and obtain first centroid state feature information by calculating a mean value of values of all state features in the first sample set and obtain second centroid state feature information by calculating a mean value of values of all state features in the second sample set, wherein the historical state feature information comprises the first centroid state feature information and the second centroid state feature information.

13. The non-transitory computer readable storage medium of claim 12, wherein the computer program to compare the current state feature information with the historical state feature information of the terminal device when the target application was closed causes the processor to calculate a distance between the current state feature information and the first centroid state feature information and a distance between the current state feature information and the second centroid state feature information;

the computer program to determine, from within the historical state feature information, the target historical state feature information closest to the current state feature information according to the comparison result causes the processor to determine centroid state feature information corresponding to a smaller distance as target centroid state feature information; and the computer program to preload the target application, in response to determining that the target application is about to be launched again causes the processor to preload the target application, in response to a sample label corresponding to the target centroid state feature information indicating "launch".

14. The non-transitory computer readable storage medium of claim 11, wherein the computer program to preload the target application further causes the processor to:

acquire remaining storage space of the terminal device; and preload the target application when the remaining storage space is greater than a preset space threshold.

\* \* \* \* \*